(12) United States Patent
Verma et al.

(10) Patent No.: US 11,477,730 B2
(45) Date of Patent: Oct. 18, 2022

(54) COORDINATED ACCESS POINT SPATIAL REUSE

(71) Applicant: QUALCOMM Incorporated, San Diego, CA (US)

(72) Inventors: Lochan Verma, Danville, CA (US); George Cherian, San Diego, CA (US); Maarten Menzo Wentink, Nijmegen (NL)

(73) Assignee: QUALCOMM Incorporated, San Diego, CA (US)

(*) Notice: Subject to any disclaimer, the term of this patent is extended or adjusted under 35 U.S.C. 154(b) by 68 days.

(21) Appl. No.: 17/080,661

(22) Filed: Oct. 26, 2020

(65) Prior Publication Data

US 2021/0136679 A1 May 6, 2021

Related U.S. Application Data

(60) Provisional application No. 62/929,653, filed on Nov. 1, 2019.

(51) Int. Cl.
*H04W 48/20* (2009.01)
*H04W 52/36* (2009.01)
(Continued)

(52) U.S. Cl.
CPC ......... *H04W 48/20* (2013.01); *H04W 52/367* (2013.01); *H04W 72/042* (2013.01);
(Continued)

(58) Field of Classification Search
CPC . H04W 48/20; H04W 52/367; H04W 72/042; H04W 72/0446; H04W 72/0453; H04W 74/0816
See application file for complete search history.

(56) References Cited

U.S. PATENT DOCUMENTS

2012/0282972 A1* 11/2012 Folkstedt .............. H04W 52/40
455/522
2012/0322493 A1* 12/2012 Nikopour ............ H04W 52/146
455/522
(Continued)

FOREIGN PATENT DOCUMENTS

WO 2019005027 A1 1/2019

OTHER PUBLICATIONS

International Search Report and Written Opinion—PCT/US2020/057508—ISA/EPO—dated Feb. 2, 2021.
(Continued)

*Primary Examiner* — Christine Ng
(74) *Attorney, Agent, or Firm* — Kevin M. Donnelly

(57) ABSTRACT

This disclosure provides methods, devices and systems for sharing resources of a wireless medium. Various implementations relate generally to coordinated transmit power control for sharing time and frequency resources of a wireless medium. Particular implementations relate more specifically to coordinated access point spatial-reuse-multiple-access techniques for sharing the time and frequency resources of a transmission opportunity. According to such techniques, an access point that wins contention and gains access to the wireless medium for the duration of a transmission opportunity may limit the transmit powers of the access points selected to share the time and frequency resources such that interference from the selected access points does not prevent stations associated with the winning access point from successfully decoding packets transmitted by it.

16 Claims, 11 Drawing Sheets

(51) Int. Cl.
*H04W 72/04* (2009.01)
*H04W 74/08* (2009.01)

(52) U.S. Cl.
CPC ... *H04W 72/0446* (2013.01); *H04W 72/0453* (2013.01); *H04W 74/0816* (2013.01)

(56) References Cited

U.S. PATENT DOCUMENTS

| | | | | |
|---|---|---|---|---|
| 2016/0212763 | A1* | 7/2016 | Hua | H04W 12/08 |
| 2017/0105217 | A1* | 4/2017 | Kwon | H04W 52/245 |
| 2017/0273140 | A1* | 9/2017 | Ryu | H04W 72/0413 |
| 2021/0120427 | A1* | 4/2021 | Wang | H04W 52/04 |
| 2021/0243806 | A1* | 8/2021 | Oteri | H04W 74/00 |

OTHER PUBLICATIONS

Jason Yuchen Guo (Huawei Technologies Co Ltd) et al., "Coordinated Spatial Reuse Operation", IEEE Draft, 11-20-0033-00-00BE-Coordinated-Spatial-Reuse-Operation, IEEE-SA Mentor, Piscataway, NJ USA, vol. 802.11 EHT, 802.11be Jan. 13, 2020 (Jan. 13, 2020), XP068165167, pp. 1-13, Retrieved from the Internet: URL:https://mentor.ieee.org/802.11/dcn/20/11-20-0033-00-00be-coordinated-spatial-reuse-operation.pptx [retrieved on Jan. 13, 2020] the whole document.

Jason Yuchen Guo (Huawei Technologies) et al., "A Unified Transmission Procedure for Multi-AP Coordination", IEEE Draft, 11-19-1102-00-00BE-A-Unified-Transmission Procedure-for-Multi-AP-Coordination, IEEE-SA Mentor, Piscataway, NJ USA, vol. 802.11 EHT, 802.11be Aug. 8, 2019 (Aug. 8, 2019), XP068153383, pp. 1-8, Retrieved from the Internet: URL:https://mentor.ieee.org/802.11/dcn/11-19-1102-00-00be-a-unified-transmission-procedure-for-multi-ap-coordination.pptx [retrieved on Aug. 8, 2019] p. 2-p. 6.

Sungjin Park (LG Electronics) et al., "Multi-AP Transmission Procedure", IEEE Draft, 11-19-0804-00-00BE-Multi-AP-Transmission-Procedure, IEEE-SA Mentor, Piscataway, NJ USA, vol. 802.11 EHT, 802.11be May 13, 2019 (May 13, 2019), XP068151150, pp. 1-14, Retrieved from the Internet: URL:https://mentor.ieee.org/802.11/dcn/19/11-19-0804-00-00be-multi-ap-transmission-procedure.pptx [retrieved on May 13, 2019] p. 3-p. 12.

* cited by examiner

COORDINATED ACCESS POINT SPATIAL REUSE

PRIORITY INFORMATION

The present Application for Patent claims priority under 35 U.S.C. § 119 to U.S. Provisional Patent Application No. 62/929,653 filed 1 Nov. 2019, entitled "COORDINATED ACCESS POINT SPATIAL REUSE," which is assigned to the assignee hereof and hereby expressly incorporated by reference herein.

TECHNICAL FIELD

This disclosure relates generally to wireless communication, and more specifically, to coordinated transmit power control for sharing the time and frequency resources of a transmission opportunity.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Conventional access techniques involve contention. APs or STAs desiring to transmit or receive data must contend for access to the wireless medium and win the contention before obtaining a transmission opportunity (TXOP) to transmit or receive data. However, conventional access techniques may use the time or frequency resources of the TXOP inefficiently, which may lead to increased latency and reduced throughput fairness.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes obtaining a transmission opportunity for wireless communication via a wireless channel. The method also includes selecting one or more other wireless access points to participate in the transmission opportunity. The method also includes determining a maximum transmit power permitted to be used by each of the one or more selected access points for transmissions during the transmission opportunity. The method additionally includes transmitting a message to the one or more selected access points that includes, for each of the selected access points: an indication of time and frequency resources of the transmission opportunity usable by the selected access point to transmit data to, or receive data from, one or more respective wireless stations associated with the access point during the transmission opportunity; and an indication of the maximum transmit power for the selected access point. The method further includes transmitting data to, or receiving data from, one or more first wireless stations associated with the first wireless access point using the indicated time and frequency resources.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor and storing processor-readable code that, when executed by the at least one processor in conjunction with the at least one modem, is configured to obtain a transmission opportunity for wireless communication via a wireless channel. The code, when executed by the at least one processor in conjunction with the at least one modem, is also configured to select one or more other wireless access points to participate in the transmission opportunity. The code, when executed by the at least one processor in conjunction with the at least one modem, is also configured to determine a maximum transmit power permitted to be used by each of the one or more selected access points for transmissions during the transmission opportunity. The code, when executed by the at least one processor in conjunction with the at least one modem, is additionally configured to transmit a message to the one or more selected access points that includes, for each of the selected access points: an indication of time and frequency resources of the transmission opportunity usable by the selected access point to transmit data to, or receive data from, one or more respective wireless stations associated with the access point during the transmission opportunity; and an indication of the maximum transmit power for the access point. The code, when executed by the at least one processor in conjunction with the at least one modem, is further configured to transmit data to, or receive data from, one or more first wireless stations associated with the first wireless access point using the indicated time and frequency resources.

Another innovative aspect of the subject matter described in this disclosure can be implemented in a method. The method includes receiving a first frame from at least one station associated with a second wireless access point. The method also includes determining a received power of the first frame. The method also includes transmitting a second frame to the second wireless access point that includes a power indication based on the received power. The method additionally includes receiving a third frame from the second wireless access point that includes: an indication of time and frequency resources of a transmission opportunity usable by the first wireless access point to transmit data to, or receive data from, one or more wireless stations associated with the first wireless access point during the transmission opportunity; and an indication of a maximum transmit power permitted to be used by the first wireless access point for transmissions using the time and frequency resources. The method further includes transmitting data to, or receiving data from, one or more of the wireless stations associated with the first wireless access point using the indicated time and frequency resources at a power at or below the indicated maximum transmit power.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor and storing processor-readable code that, when executed by the at least one processor in conjunction with the at least one modem, is configured to receive a first frame from at least one station associated with a second wireless access point. The code, when executed by the at least one processor in conjunction with the at least one modem, is also configured to determine a received power of the first frame. The code, when executed by the at least one processor in conjunction with the at least one modem, is also configured to transmit a second frame to the second wireless access point that includes a power indication based on the received power. The code, when executed by the at least one processor in conjunction with the at least one modem, is additionally configured to receive a third frame from the second wireless access point that includes: an indication of time and frequency resources of a transmission opportunity usable by the first wireless access point to transmit data to, or receive data from, one or more wireless stations associated with the first wireless access point during the transmission opportunity; and an indication of a maximum transmit power permitted to be used by the first wireless access point for transmissions using the time and frequency resources. The code, when executed by the at least one processor in conjunction with the at least one modem, is further configured to transmit data to, or receive data from, one or more of the wireless stations associated with the first wireless access point using the indicated time and frequency resources at a power at or below the indicated maximum transmit power.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
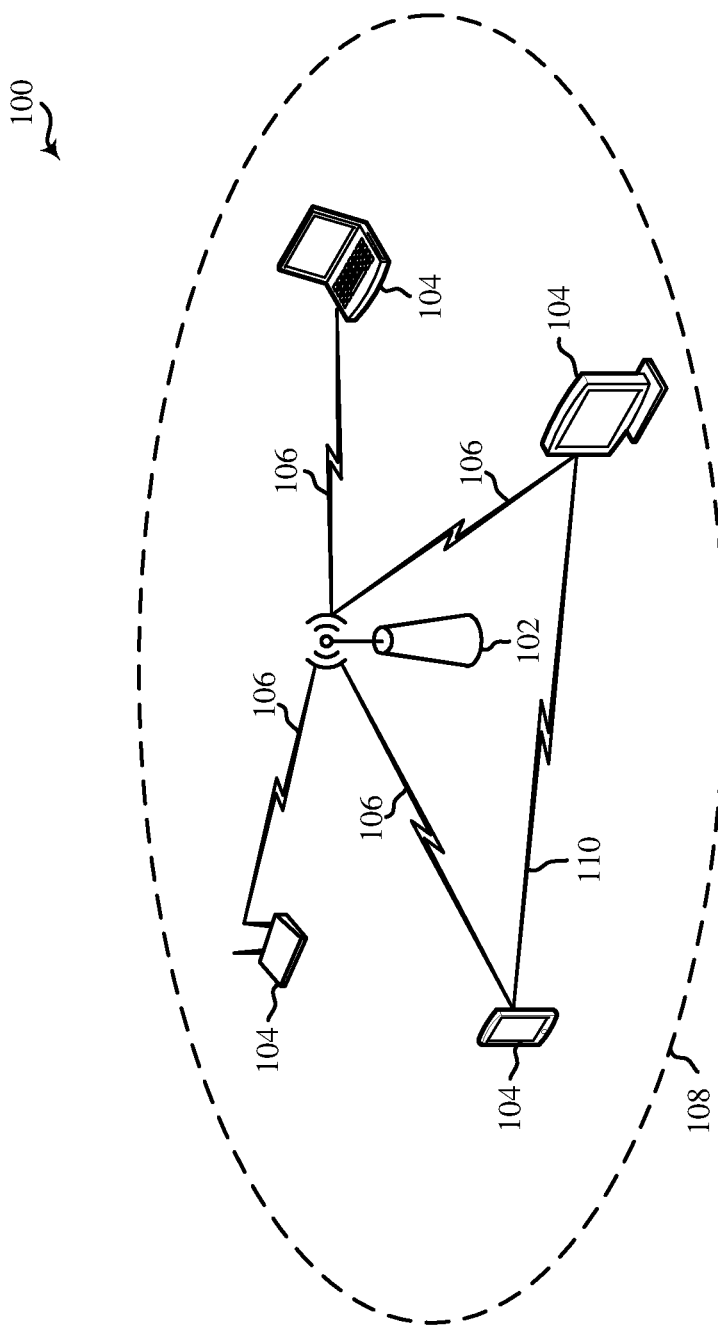
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to coordinated transmit power control for sharing time and frequency resources of a wireless medium. Particular implementations relate more specifically to coordinated AP (CAP) spatial-reuse-multiple-access (SRMA) techniques for sharing the time and frequency resources of a transmission opportunity (TXOP). According to such techniques, an AP that wins contention and gains access to the wireless medium for the duration of a TXOP (referred to as the TXOP owner) may limit the transmit powers of the APs selected to share the time and frequency resources such that interference from the selected APs does not prevent STAs associated with the TXOP owner from successfully decoding packets transmitted by the TXOP owner.

Particular implementations of the subject matter described in this disclosure can be implemented to realize one or more of the following potential advantages. In some implementations, the described techniques can be used to reduce latency because the TXOP owner may share a TXOP with other APs, and as such, the other APs may not need to wait to win contention for a TXOP to be able to transmit and receive data according to conventional CSMA/CA or EDCA techniques. Additionally or alternatively, some implementations can achieve improvements in throughput fairness. Various implementations may achieve these and other advantages without requiring that the TXOP owner or the other APs selected to participate in the TXOP be aware of the STAs associated with other BSSs (OBSSs), without requiring a preassigned or dedicated master AP or preassigned groups of APs, and without requiring backhaul coordination between the APs participating in the TXOP.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
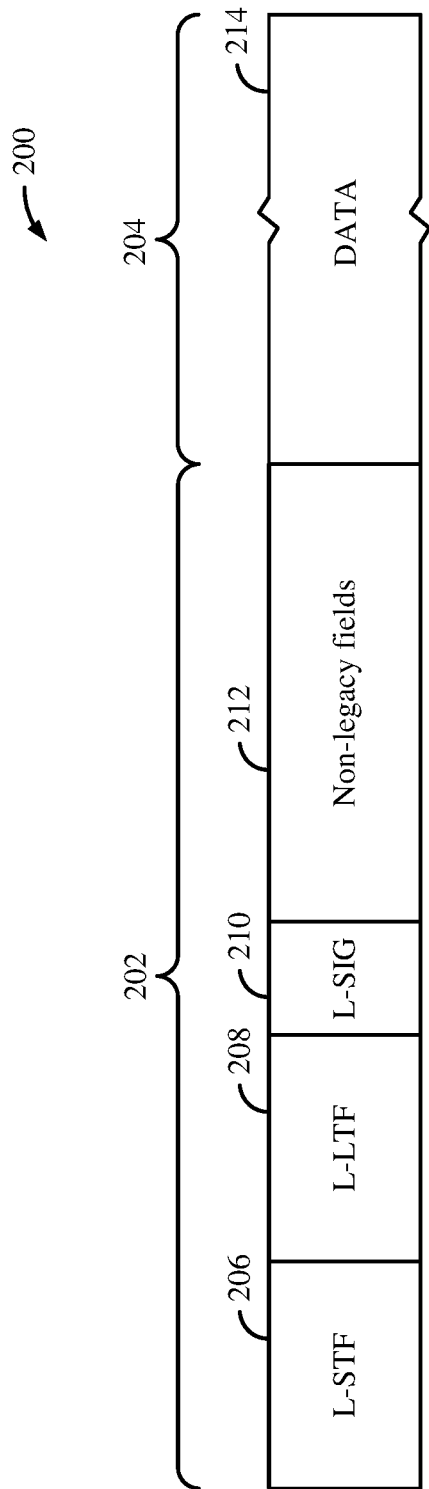
FIG. 2A shows an example protocol data unit (PDU) usable for communications between an access point (AP) and a number of stations (STAs).

FIG. 2A shows an example protocol data unit (PDU) 200 usable for wireless communication between an AP and a number of STAs. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol standards.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
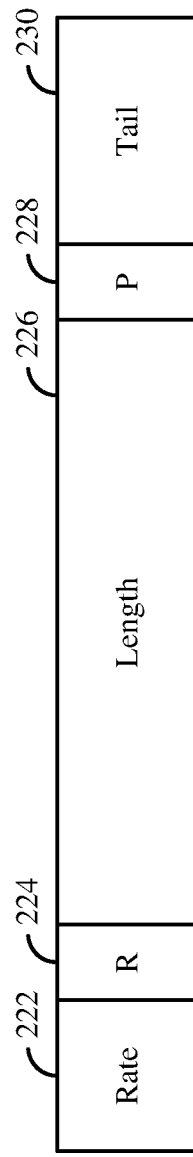
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
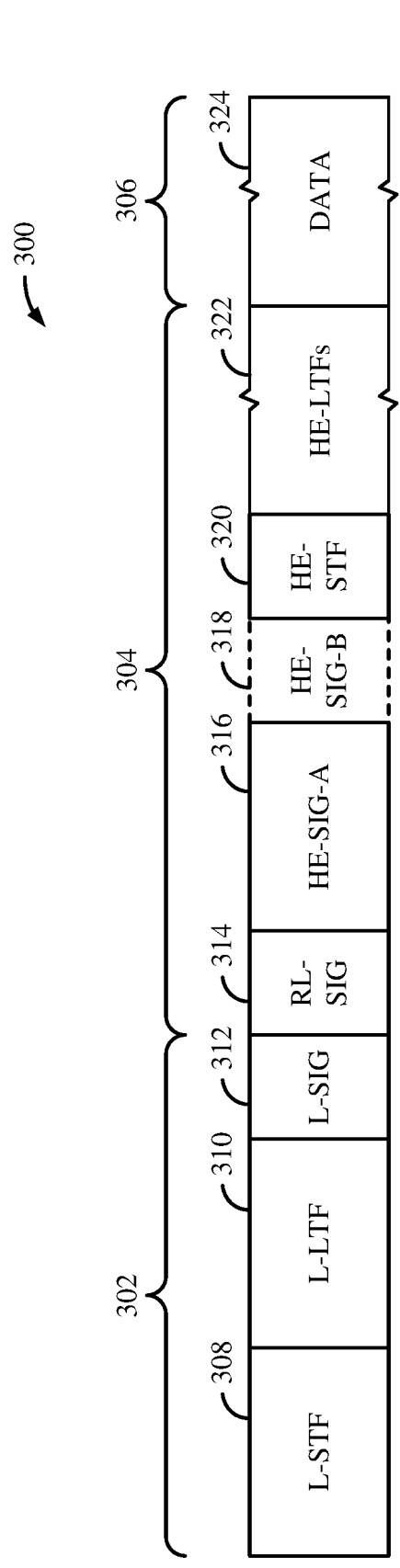
FIG. 3A shows an example PHY layer convergence protocol (PLCP) protocol data unit (PPDU) usable for communications between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
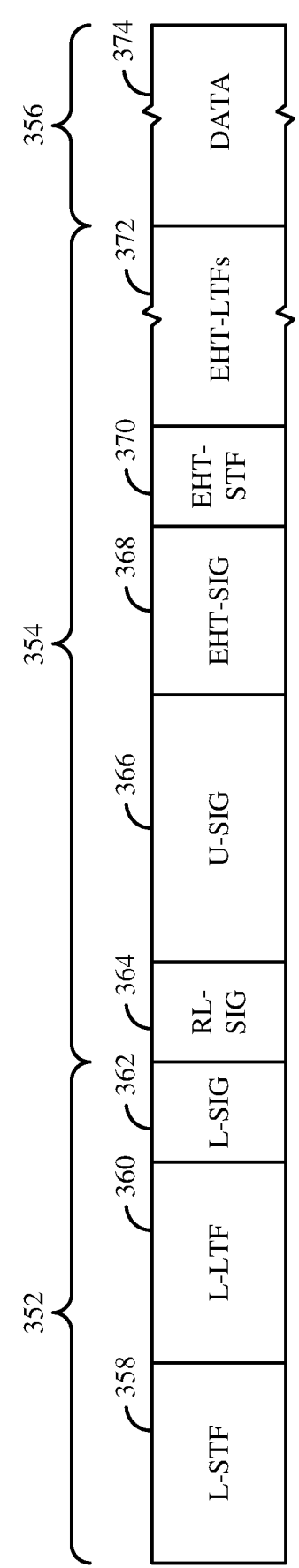
FIG. 3B shows another example PPDU usable for communications between an AP and one or more STAs.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy.

Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA may include both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Figure 4:
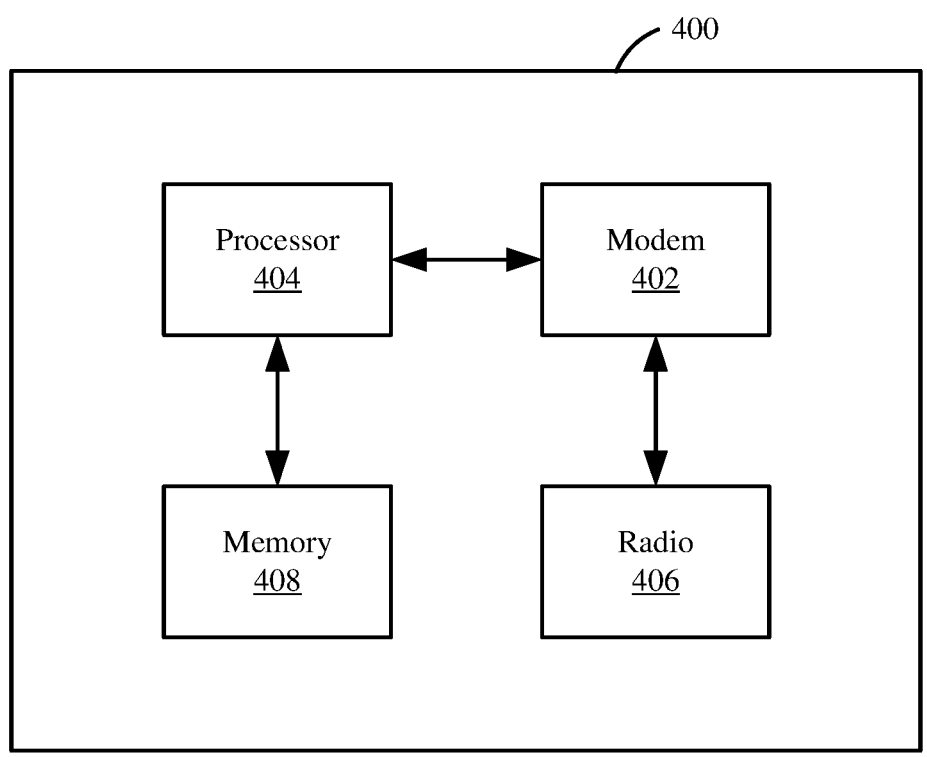
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more processors, processing blocks or processing elements 404 (collectively "the processor 404") coupled with the modem 402. In some implementations, the wireless communication device 400 additionally includes one or more radios 406 (collectively "the radio 406") coupled with the modem 402. In some implementations, the wireless communication device 400 further includes one or more memory blocks or elements 408 (collectively "the memory 408") coupled with the processor 404 or the modem 402.

The modem 402 can include an intelligent hardware block or device such as, for example, an application-specific integrated circuit (ASIC), among other examples. The modem 402 is generally configured to implement a PHY layer, and in some implementations, also a portion of a MAC layer (for example, a hardware portion of the MAC layer). For example, the modem 402 is configured to modulate packets and to output the modulated packets to the radio 406 for transmission over the wireless medium. The modem 402 is similarly configured to obtain modulated packets received by the radio 406 and to demodulate the packets to provide demodulated packets. In addition to a modulator and a demodulator, the modem 402 may further include digital signal processing (DSP) circuitry, automatic gain control (AGC) circuitry, a coder, a decoder, a multiplexer and a demultiplexer. For example, while in a transmission mode, data obtained from the processor 404 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 404) for processing, evaluation or interpretation.

The radio 406 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 406, which then transmits the symbols via the coupled antennas. Similarly, symbols received via the antennas are obtained by the radio 406, which then provides the symbols to the modem 402.

The processor 404 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 404 processes information received through the radio 406 and the modem 402, and processes information to be output through the modem 402 and the radio 406 for transmission through the wireless medium. For example, the processor 404 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 404 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 404, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
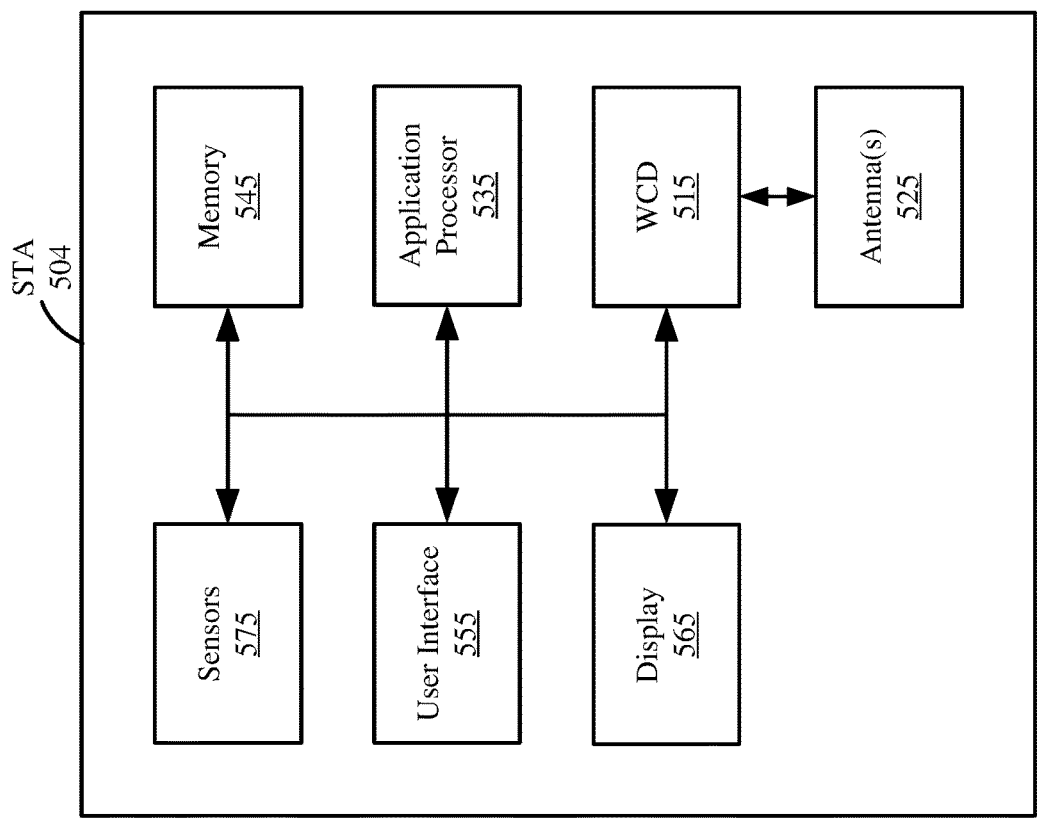
FIG. 5B shows a block diagram of an example STA.
Figure 5A:
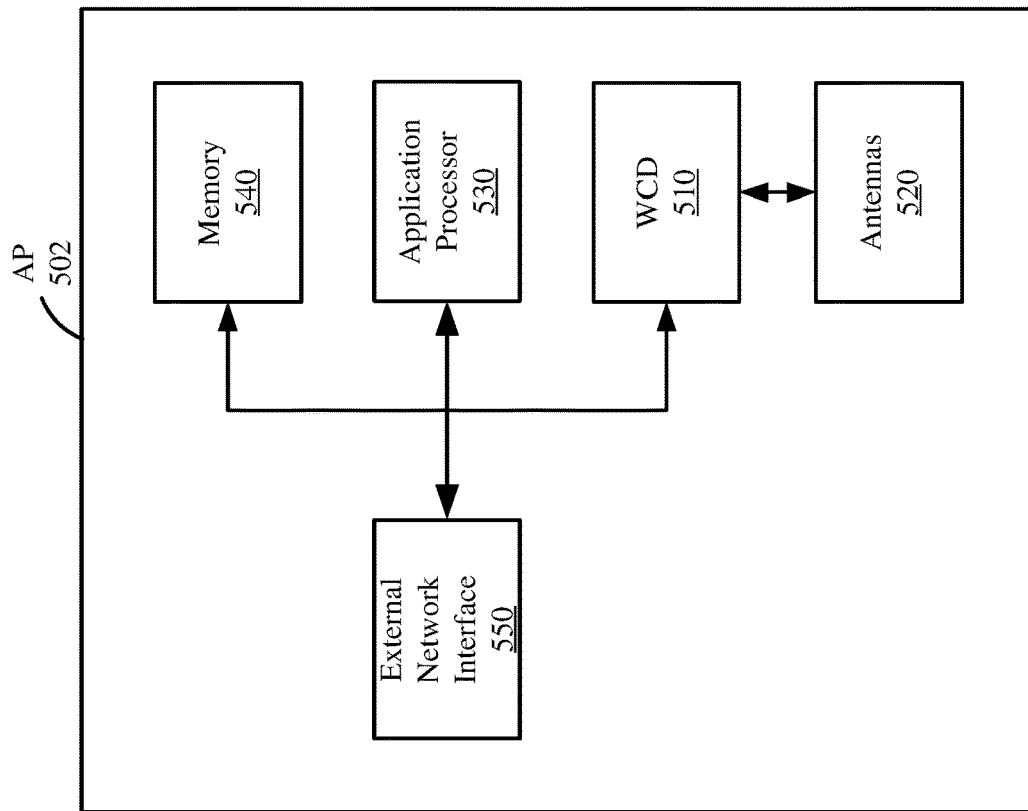
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 4000 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Various implementations relate generally to coordinated transmit power control for sharing time and frequency resources of a wireless medium. Particular implementations relate more specifically to coordinated AP (CAP) spatial-reuse-multiple-access (SRMA) techniques for sharing the time and frequency resources of a TXOP. According to such techniques, an AP that wins contention and gains access to the wireless medium for the duration of a TXOP (referred to as the TXOP owner) may limit the transmit powers of the APs selected to share the time and frequency resources such that interference from the selected APs does not prevent STAs associated with the TXOP owner from successfully decoding packets transmitted by the TXOP owner.

Particular implementations of the subject matter described in this disclosure can be implemented to realize one or more of the following potential advantages. In some implementations, the described techniques can be used to reduce latency because the TXOP owner may share a TXOP with other APs, and as such, the other APs may not need to wait to win contention for a TXOP to be able to transmit and receive data according to conventional CSMA/CA or EDCA techniques. Additionally or alternatively, some implementations can achieve improvements in throughput fairness. Various implementations may achieve these and other advantages without requiring that the TXOP owner or the other APs selected to participate in the TXOP be aware of the STAs associated with other BSSs (OBSSs), without requiring a preassigned or dedicated master AP or preassigned groups of APs, and without requiring backhaul coordination between the APs participating in the TXOP.

Figure 6:
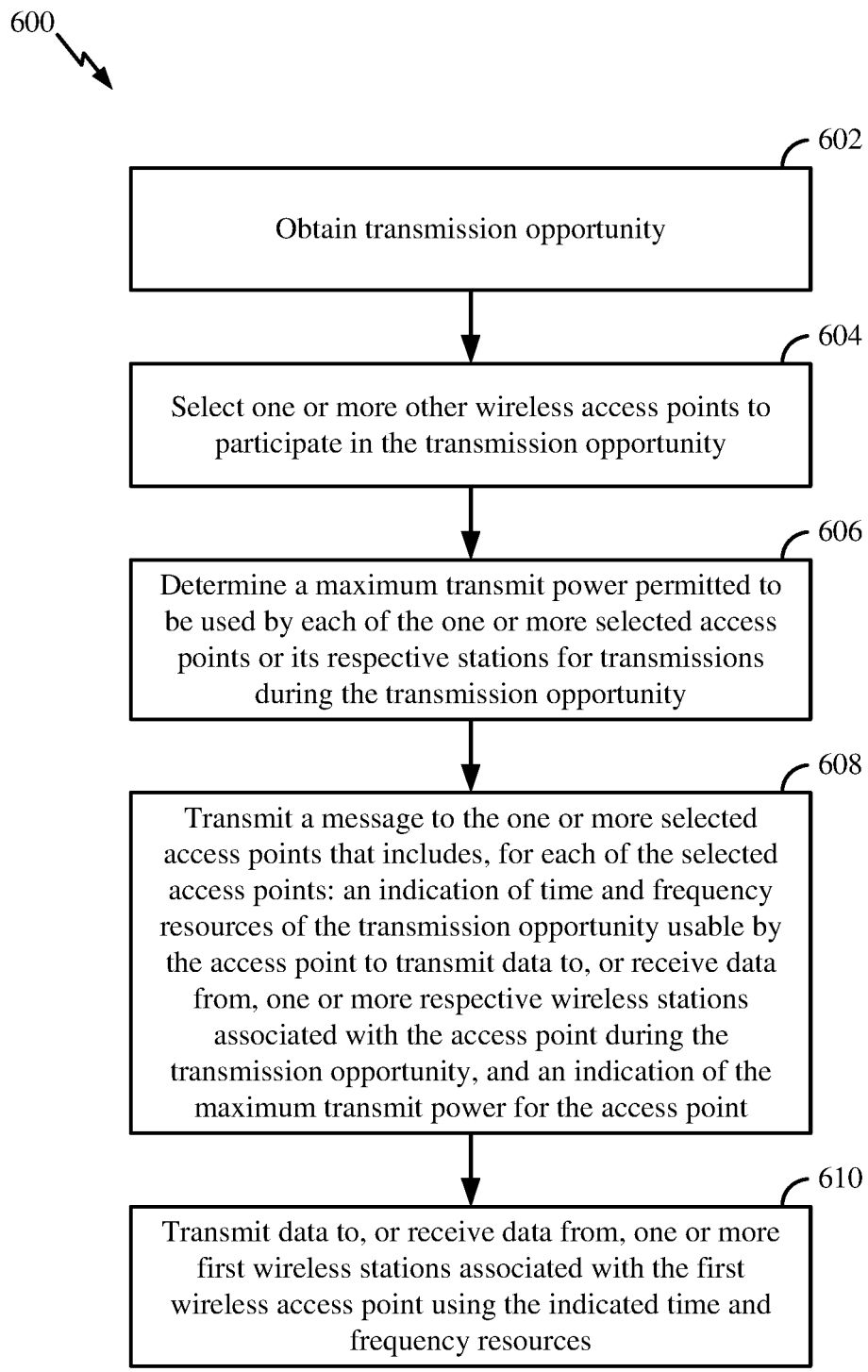
FIG. 6 shows a flowchart illustrating an example process for coordinated wireless communication that supports resource sharing according to some implementations.

FIG. 6 shows a flowchart illustrating an example process 600 for coordinated wireless communication that supports resource sharing according to some implementations. The operations of the process 600 may be implemented by an AP or its components as described herein. For example, the process 600 may be performed by a wireless communication device such as the wireless communication device 400 described above with reference to FIG. 4. In some implementations, the process 600 may be performed by an AP, such as one of the APs 102 and 502 described above with reference to FIGS. 1 and 5A, respectively.

In some implementations, in block 602, the wireless communication device (hereinafter referred to as the first AP or TXOP owner) obtains a TXOP for wireless communication via a wireless channel. In block 604, the TXOP owner selects one or more other coordinated wireless APs to participate in the TXOP. In block 606, the first AP determines a maximum transmit power permitted to be used by each of the one or more selected APs or its respective stations for transmissions during the transmission opportunity. In block 608, the first AP transmits a message to the one or more selected access points that includes, for each of the selected APs an indication of time and frequency resources of the transmission opportunity usable by the access point to transmit data to, or receive data from, one or more respective wireless stations associated with the access point during the transmission opportunity. The message further includes, for each of the selected APs, an indication of the maximum transmit power for the access point. In block 610, the first AP transmits data to, or receives data from, one or more first wireless STAs associated with the first AP using the indicated time and frequency resources.

Figure 7:
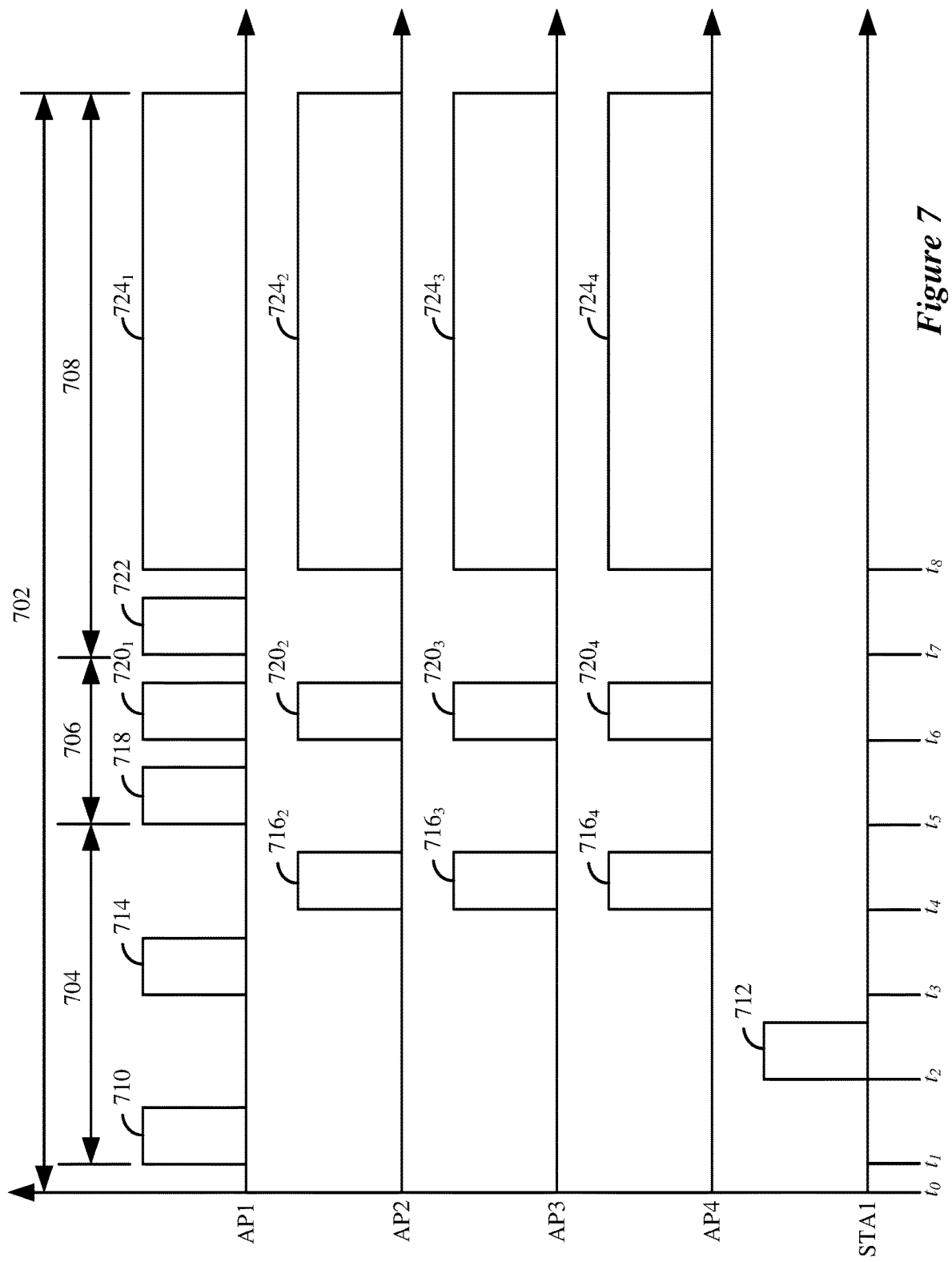
FIG. 7 shows a timing diagram illustrating the transmissions of communications in the example process of FIG. 6.

FIG. 7 shows a timing diagram illustrating the transmissions of communications in the example process of FIG. 6.

In the example illustrated in FIG. 7, the TXOP owner (AP1) obtains a TXOP 702 and shares it with multiple other APs (AP2, AP3 and AP4). As illustrated in FIG. 7, in some implementations of the process 600, the TXOP 702 includes multiple phase or stages including a first TXOP indication phase 704, a second schedule allocation phase 706, and a third data transmission phase 708.

In some implementations, to obtain the TXOP 702 in block 602, the first AP contends for access to the wireless medium on one or more channels including a primary operating channel (for example, a primary 20 MHz channel and one or more secondary 20 MHz, 40 MHz, 80 MHz or 160 MHz channels) using, for example, CSMA/CA and enhanced distributed channel access (EDCA) techniques. The TXOP 702 may be obtained at time to for a wideband wireless channel, such as a bonded channel formed by the primary channel and the one or more secondary channels. For example, the wideband wireless channel may be a 40 MHz, 80 MHz, 160 MHz or 320 MHz channel.

Figure 8:
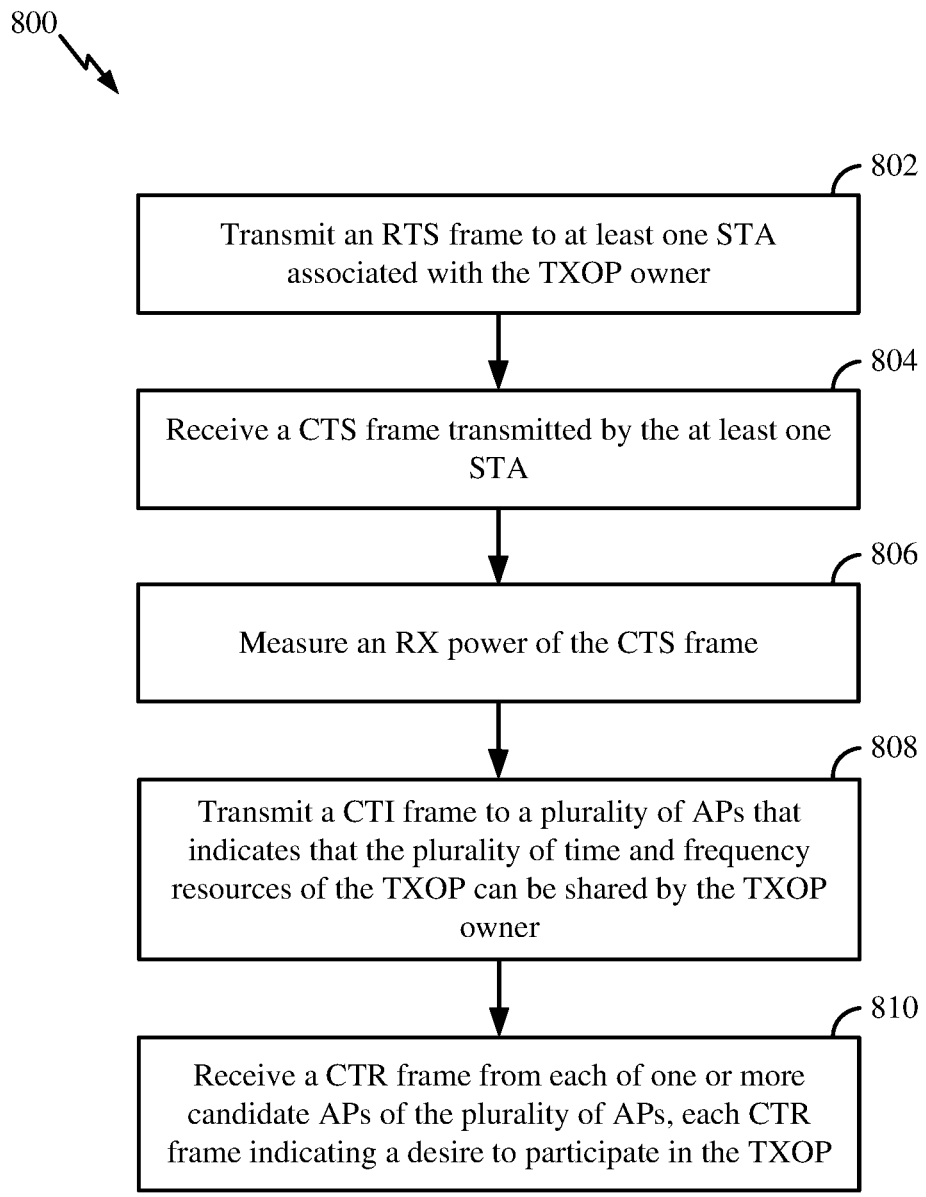
FIG. 8 shows a flowchart illustrating an example transmission opportunity (TXOP) indication process for advertising an availability of time and frequency resources in the TXOP.

In some implementations, to select the one or more other APs to participate in the TXOP in block 604, the TXOP owner AP1 performs a TXOP availability indication process during the TXOP indication phase 704 during which the TXOP owner AP1 learns of the other APs' desires or intents to participate in the TXOP 702. For example, FIG. 8 shows a flowchart illustrating an example TXOP indication process 800 for advertising an availability of time and frequency resources in the TXOP 702. In some implementations, after obtaining the TXOP 702 in block 602 of the process 600, the TXOP owner AP1 transmits, in block 802 of the process 800, a first frame 710 to at least one station (STA1) associated with the TXOP owner AP1 at time $t_1$. For example, the first frame 710 may be a control frame. In some implementations, the first frame 710 is a request-to-send (RTS) frame (hereinafter the first frame 710 will be referred to as the RTS frame 710, although other possibilities exist) addressed to the STA1. In some other implementations, the RTS frame 710 may be an MU-RTS frame intended for multiple STAs associated with the TXOP owner AP1. The RTS frame 710 is configured to cause the STA1 to transmit a clear-to-send (CTS) frame 712 at time $t_2$. Any other wireless communication devices, including the APs AP2, AP3 and AP4, and their associated STAs, that receive either or both of the RTS frame 710 or the CTS frame 712 may set their respective network allocation vectors (NAVs) for a duration of time indicated in the RTS or CTS frames.

In block 804, the TXOP owner AP1 receives the CTS frame 712 from the STA1 and, in block 806, measures or otherwise determines a received power (RX power) of the CTS frame 712. In some implementations, the other APs, including AP2, AP3 and AP4, are further configured to measure the RX power of the CTS frame 712. For example, the TXOP owner AP1 and the other APs may be configured to determine a received signal strength indication (RSSI) value for the CTS frame 712.

In block 808, at time $t_3$, the TXOP owner AP1 transmits a third frame (also referred to herein as a CAP TXOP indication (CTI) frame) 714 to other wireless APs, for example, other APs in its extended service set (ESS), that indicates that the time and frequency resources of the TXOP 702 can be shared by the TXOP owner AP1. For example, the TXOP owner AP1 may have previously become aware of the other neighboring APs in its vicinity based on information in beacons or other management frames received from the other APs.

In block 810, after transmitting the CTI frame 714, the TXOP owner AP1 may receive, at time $t_4$, a fourth frame (also referred to herein as a CAP TXOP request (CTR) frame) 716 from each of one or more candidate APs that indicates a desire by the respective AP to participate in the TXOP 702. In the example illustrated in FIG. 7, AP2, AP3 and AP4 are among the candidate APs that transmit respective CTR frames 7162, 7163 and 7164 to the TXOP owner AP1 in block 810. In some implementations, each CTR frame 716 includes a power indication. For example, the power indication may be the RX power of the CTS frame 712 measured by the respective AP. In some other implementations, the power indication may be another metric, parameter or value based on the RX power. In some implementations, the receipt of the CTR frame 716 or the power indication may serve as the indication that the respective AP desires to participate in the TXOP 702.

In some implementations, the CTI frame 714 includes at least one trigger frame configured to trigger the one or more candidate APs to transmit the respective CTR frames 716. To transmit the CTI frame 714, the TXOP owner AP1 may transmit a PPDU that includes a same CTI trigger frame in each of multiple subchannels of the wireless channel (for example, in each of multiple 20 MHz channels). For example, the CTI frame 714 may include a non-high-throughput (non-HT) duplicate trigger frame in each 20 MHz channel. In this way, the other APs do not need to be operating on the same primary 20 MHz channel to receive and process the CTI frame 714. In some implementations, a source address field and a BSSID field (for example, in a MAC header) associated with the CTI frame 714 may be set to the MAC address of the TXOP owner AP1 and a destination address field (for example, in the MAC header) associated with the CTI frame 714 is set to a broadcast address.

Each duplicate trigger frame of the CTI frame 714 may include, for each of the multiple APs that may participate in the TXOP, an indication of one or both of frequency resources or spatial resources usable by the respective AP to transmit its respective CTR frame 716. For example, each trigger frame of the CTI frame 714 may include a user information field for each of the access points that includes the respective indication of the frequency resources or the spatial resources the AP is to use to transmit its CTR frame 716. Each user information field may include a respective AP identifier (APID) of the respective AP. For example, the APID may be a MAC address of the AP, a BSSID associated with the AP or a BSS color associated with the AP. In some other implementations in which the TXOP owner AP1 may not be aware of some or all of the neighboring APs, the CTI frame 714 may include an indication of random access resources usable by the APs to transmit their respective CTR frames 712.

The CTR frames 716 may be received from the candidate APs in respective trigger-based PPDUs in response to the CTI frame 714 using the frequency or spatial resources allocated by the CTI frame 714. For example, the CTR frames 716 may be transmitted via MU OFDMA or MU MIMO techniques and may be received at time $t_4$ a SIFS duration after the CTI frame 714. For the APs capable of CAP SRMA, the CTI frame 714 may be configured to cause the APs to respond with respective CTR frames 716 regardless of their respective NAVs.

In some implementations, the TXOP owner AP1 may transmit multiple CTI frames 714, each to a respective one of the APs, on an AP-by-AP sequential basis. An AP desiring to participate in the TXOP may transmit, in response to receiving a respective one of the CTI frames 714, a CTR frame 716 before the transmission of a next CTI frame 714 to a next one of the APs. For example, each CTI frame 714 may be a poll frame and each CTR frame 716 may be a poll response frame. Such CTI frames 714 and CTR frames 716 may be transmitted as single-user (SU) transmissions. In some other implementations, the TXOP owner AP1 may transmit a single CTI frame 714, and subsequently, transmit a polling frame (poll) to each of the APs, on an AP-by-AP sequential basis, that solicits a response CTR frame 716 from the respective AP before the transmission of a poll to a next one of the APs.

Referring back to the process 600, based on the receipt of the CTR frames 716, the TXOP owner AP1 may then select one or more of the candidate APs to participate in the TXOP 702 in block 604. The TXOP owner AP1 selects the APs to participate in the TXOP 702 from the candidate APs based on the power indications received in the CTR frames 716. The TXOP owner AP1 may select the APs such that it still protects its own transmissions (which may be referred to as primary transmissions) to and from the STAs in its BSS. Prior to selecting the APs to participate, the TXOP owner AP1 may already be aware of the acceptable signal-to-interference ratios (SIRs) at its associated STAs that enable the successful decoding of the packets for each of one or more selectable MCSs.

The acceptable SIR (or SIR threshold) at a given STA may be quantified as Equation 1 below, where $TX_{AP1}$ is the TX power the TXOP owner AP1 intends to transmit at, $TX_{CAP}$ is the TX power of a respective one of the candidate APs (including AP2, AP3 and AP4), $PL_{AP1}$ is the pathloss between the TXOP owner AP1 and the associated STA that transmitted the CTS frame 712 (STA1), and $PL_{CAP}$ is the pathloss between the respective one of the candidate APs and STA1.

$$SIR = (TX_{AP1} - PL_{AP1}) - (TX_{CAP} - PL_{CAP}) \quad (1)$$

The pathlosses $PL_{AP1}$ and $PL_{CAP}$ can, in turn, be represented as Equations 2 and 3 below.

$$PL_{AP1} = TX_{STA} - RX_{AP1-STA} \quad (2)$$

$$PL_{CAP} = TX_{STA} - RX_{CAP-STA} \quad (3)$$

where $TX_{STA}$ is the TX power of STA1 and $RX_{AP1-STA}$ is the RX power of the CTS frame 712 at the TXOP owner AP1. The TXOP owner AP1 may select AP2, AP3 and AP4 from the candidate APs to participate in the TXOP 702 based on the pathlosses in block 604.

Referring again back to the process 600, the TXOP owner AP1 may, in block 606, calculate or otherwise determine the TX power $TX_{AP1}$ that it will transmit at for transmissions to one or more associated STAs including STA1 during the data transmission phase 708. Similarly, the TXOP owner AP1 may calculate or otherwise determine a respective maximum transmit power $TX_{MAX}$ for each of the selected APs AP2, AP3 and AP4 based on the acceptable SIR and the power indications received from the selected APs. For example, based on rearranging Equation 1 above, the maximum TX power $TX_{MAX}$ for each one of the selected APs may be expressed as Equation 4 below, where the SIR term represents a threshold, which may be different than the acceptable SIR.

$$TX_{MAX} = TX_{AP1} + PL_{CAP} - PL_{AP1} - SIR \quad (4)$$

Based on substituting Equations 2 and 3 into Equation 4, the maximum TX power $TX_{MAX}$ for a given one of the selected APs may be re-expressed as Equation 5 below.

$$TX_{MAX} = TX_{AP1} + RX_{AP1-STA} - RX_{CAP-STA} - SIR \quad (5)$$

As such, the TXOP owner AP1 can determine the maximum TX power $TX_{MAX}$ for each one of the selected APs using Equation 5 based on the acceptable SIR for STA1, its own TX power $TX_{AP1}$, its measurement of the RX power $RX_{AP1-STA}$ of the CTS frame 712, and the RX power $RX_{CAP-STA}$ of the CTS frame 712 indicated in the CTR frame 716 from the respective AP.

Figure 9:
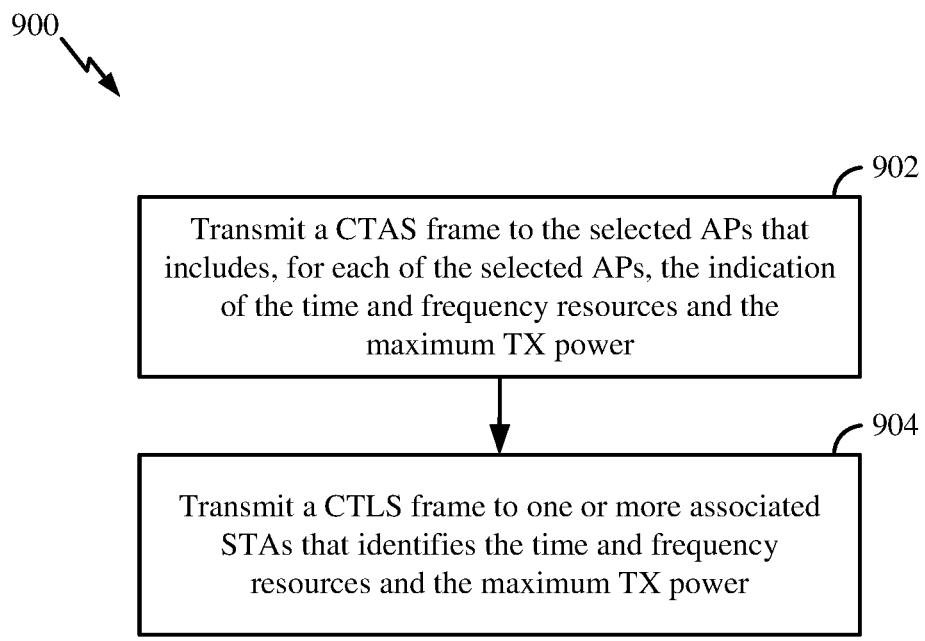
FIG. 9 shows a flowchart illustrating an example schedule allocation process for allocating time and frequency resources in the TXOP.

After selecting the APs to participate in the TXOP 702 during the TXOP indication phase 704, the TXOP owner AP1 then grants, schedules or otherwise actually allocates (for example, indicates the allocations of) the respective time and frequency resources and maximum TX powers to the selected APs in the schedule allocation phase 706. For example, FIG. 9 shows a flowchart illustrated an example schedule allocation process 900 for allocating time and frequency resources in the TXOP 702. In block 902, at time $t_5$, the TXOP owner AP1 transmits a fifth frame (referred to herein as a CAP TXOP AP schedule (CTAS) frame) 718 that identifies the selected APs and that includes the indication of the time and frequency resources available in the data transmission phase 708. In some implementations, the CTAS frame 718 further includes, for each of the selected APs, an indication of the maximum TX power usable by the respective AP to transmit data to, or receive data from, one or more respective associated STAs during the TXOP 702 via the time and frequency resources. For example, block 902 of the process 900 may be an example implementation of block 608 of the process 600. For example, the CTAS frame 718 may be transmitted at time is a SIFS duration after the CTR frames 716.

In block 904, after transmitting the CTAS frame 718, the TXOP owner AP1 may transmit, at time $t_6$, a sixth frame (referred to herein as a CAP TXOP Local Schedule (CTLS) frame) $720_1$ to one or more associated STAs in its BSS. Similarly, each of the selected APs AP2, AP3 and AP4 may also transmit respective CTLS frames $720_2$, $720_3$ and $720_4$, respectively, to the associated wireless STAs in their respective BSSs at time $t_6$. Each of the CTLS frames 720 identifies the time and frequency resources as well as the maximum TX power allocated to the respective AP and its associated BSS. For the APs capable of CAP SRMA, the CTAS frame 718 may be configured to cause the selected APs to transmit the respective CTLS frames 720 regardless of their respective NAVs.

In some implementations, the CTAS frame 718 includes at least one trigger frame configured to trigger the selected APs AP2, AP3 and AP4 to transmit the respective CTLS frames $720_2$, $720_3$ and $720_4$ to their associated BSSs simultaneously with the TXOP owner AP1 transmitting the CTLS frame $720_1$ to its associated BSS at time $t_6$, for example, a SIFS duration after the CTAS frame 718. To transmit the CTAS frame 718, the TXOP owner AP1 may transmit a PPDU that includes a same CTAS trigger frame in each of multiple subchannels of the wireless channel (for example, in each of multiple 20 MHz channels). For example, the CTAS frame 718 may include a non-HT duplicate trigger frame in each 20 MHz channel. In this way, the other APs do not need to be operating on the same primary 20 MHz channel to receive and process the CTAS frame 718. In some implementations, a source address field and a BSSID field (for example, in a MAC header) associated with the CTAS frame 718 may be set to the MAC address of the TXOP owner AP1 and a destination address field (for example, in the MAC header) associated with the CTAS frame 718 may be set to a broadcast address.

Each duplicate trigger frame of the CTAS frame 718 may include an indication of the time and frequency resources available for use during the data transmission phase 708. For example, each trigger frame of the CTAS frame 718 may include a user information field for each of the selected APs. Each user information field may include or be identified by a respective APID of the respective AP. For example, the APID may be a MAC address of the AP, a BSSID associated with the AP or a BSS color associated with the AP. Each user information field may include, for the respective AP, an indication of the available time and frequency resources (or a particular allocation of the time and frequency resources allocated to the respective AP) for use during the data transmission phase 708. For example, each user information field may include an indication of a starting time of the available or allocated time resources, such as, an indication of a symbol, a slot or an absolute or relative time at which the time resources begin. The user information field may also include a duration of the respective time resources, for example, in units of symbols, slots or milliseconds (ms). Each user information field may additionally include an indication of frequency resources available for use by or allocated to the respective AP. For example, the user information field may indicate one or more channels or subchannels (for example, one or more 20 MHz channels) or one or more resource units (RUs) usable by the respective AP.

Each duplicate trigger frame of the CTAS frame 718 may further include, for each of the selected APs, an indication of the maximum TX power permitted to be used by the respective AP during the data transmission phase 708. For example, in some implementations, each user information field includes a value (for example, in dBs per 20 MHz or in some other unit) that explicitly indicates the respective maximum TX power for the respective AP, for example, as calculated based on Equation 5. Additionally or alternatively, in some implementations, the TXOP owner AP1 may provide an implicit indication of the maximum TX power in the CTAS frame 718. For example, each user information field may include an indication of the maximum TX power in the form of, for example, an indication of the TX power $TX_{AP1}$ of the TXOP owner AP1, an indication of AP1's measurement of the RX power $RX_{AP1\text{-}STA}$ of the CTS frame 712, and an indication of the SIR. In such examples, each selected AP receiving the CTAS frame 718 may determine the value of its maximum permitted TX power $TX_{MAX}$ based on the indications of $TX_{AP1}$, $RX_{AP1\text{-}STA}$, and the SIR received in the CTAS frame 718, based on its own measured RX power $RX_{CAP\text{-}STA}$ of the CTS frame 712, and based on Equation 5.

In some implementations or instances, the TXOP owner AP1 and one or more of the selected APs AP2, AP3 and AP4 may be configured for communication via CAP SRMA as well as CAP TDMA or CAP OFDMA simultaneously. In other implementations or instances, the CTAS frame 718 may allocate all of the available time resources or all of the available frequency resources of the data transmission phase 708 to each of the selected APs.

In some implementations, the CTLS frames 720 transmitted by the TXOP owner AP1 and the selected APs AP2, AP3 and AP4 are non-HT duplicate frames. That is, in some implementations, each of the CTLS frames 720 is identical to the others. Additionally, each of the CTLS frames 720 transmitted by the TXOP owner AP1 and the selected APs AP2, AP3 and AP4 may be transmitted simultaneously via all of the available frequency resources of the wireless channel. In this way, the CTLS frames 720 will not destructively interfere with each other and the STAs receiving the CTLS frames 720 may properly decode them. In some implementations, a source address field (for example, in a MAC header) associated with each of the CTLS frames 720 is set to the same multicast address or other predefined address associated with CAP SRMA transmissions. STAs supporting CAP SRMA may be configured such that when they receive frames having the multicast address, they decode and parse the respective frames. In some implementations, a BSSID field (for example, in the MAC header) associated with each of the CTLS frames 720 is set to the BSSID of the TXOP owner AP1. In some such implementations, a destination address field (for example, in the MAC header) associated with each of the CTLS frames 720 is set to the same broadcast address.

In some implementations, each of the CTLS frames 720 transmitted by the TXOP owner AP1 and the selected APs AP2, AP3 and AP4 includes an information element (IE) or other field for each of the APs AP1, AP2, AP3 and AP4 (and its associated BSS) that includes, for the respective AP or BSS, an indication of the available time and frequency resources (or a particular allocation of the time and frequency resources allocated to the respective AP or BSS). For example, each IE may include an indication of the starting time of the available or allocated time resources, such as, an indication of a symbol, a slot or an absolute or relative time at which the time resources begin. The IE may also include an indication of the duration of the time resources, for example, in units of symbols, slots or ms. Each IE may additionally include an indication of the frequency resources available for use by or allocated to the respective AP or BSS. For example, the IE may indicate one or more channels or subchannels (for example, one or more 20 MHz channels) or one or more RUs usable by the respective AP and its BSS. Each IE may further include an indication of the maximum TX power permitted to be used by the respective AP and the STAs within its BSS during the data transmission phase 708. Because the STAs associated with the selected APs may not be in range of, or otherwise be able to receive and process the CTAS frame 718, the use of the CTLS frames 720 ensures that the STAs become aware of the time and frequency resources, as well as the maximum permitted TX power, and informs the STAs that they should be in an active listening mode to monitor for the identified time and frequency resources.

After the AP and local scheduling during the schedule allocation phase 706, the data transmission phase 708 may begin. As described above, in block 610, the TXOP owner AP1 and the selected APs AP2, AP3 and AP4 may share the time and frequency resources of the TXOP to perform or enable downlink (DL) or uplink (UL) communications with their respective associated STAs. In some implementations, the TXOP owner AP1 may synchronize the coordinated APs in time. For example, in some implementations, in a beginning portion of the data transmission phase 708, the TXOP owner AP1 transmits a trigger frame (referred to herein as a CAP TXOP trigger (CTTRIG) frame) 722 to the selected access points at time $t_7$ (after the CTLS frames 720 are transmitted) to synchronize in time the selected APs with the TXOP owner AP1.

In some implementations, in addition to, or as an alternative to, indicating the maximum TX power for each of the selected APs in the CTAS frame 718, the TXOP owner AP1 may indicate the maximum TX powers in the CTTRIG frame 722. For example, the CTTRIG frame 722 may include a user information field, IE or other field for each of the selected APs that includes a respective APID of the respective AP, such as a MAC address of the AP, a BSSID associated with the AP or a BSS color associated with the AP. Each user information field, IE or other field may also include an indication of the available time and frequency resources (or a particular allocation of the time and frequency resources allocated to the respective AP) as well as an indication of the maximum TX power permitted to be used by the respective AP and its BSS during the data transmission phase 708.

In some implementations, data communications may begin a SIFS duration after the CTTRIG frame 722. The APs capable of CAP SRMA may be configured to transmit and receive data communications, acknowledgement (ACK) frames, and trigger frames regardless of their respective NAVs during the data transmission phase 708. Additionally, the STAs compatible with CAP SRMA may be configured to be in an active listening mode during the data transmission phase 708 such that they may transmit and receive data communications, ACK frames, and trigger frames regardless of their respective NAVs.

For example, as illustrated in FIG. 7, the TXOP owner AP1 may transmit or receive one or more data communications $724_1$ to or from one or more STAs in its BSS beginning at time is using some or all of the available time and frequency resources at or below a maximum TX power it determined for itself in the process 800. For example, the TXOP owner AP1 may transmit a DL data communication (for example, a PPDU) $720_1$ including a data frame to multiple STAs using multi-user (MU) orthogonal frequency division multiple access (OFDMA). Additionally or alternatively, the TXOP owner AP1 may transmit a data frame to multiple STAs using MU multiple-input multiple-output (MIMO). Additionally or alternatively, the TXOP owner AP1 may transmit a data frame to a single STA using single-user (SU) techniques. In some such implementations in which the TXOP owner AP1 transmits one or more DL data communications $724_1$, the associated STAs may respond with ACK frames (such as Block ACKs (BAs)) also using some or all of the available time and frequency resources of the data transmission phase 708.

In addition to, or as an alternative to, transmitting DL data communications, the TXOP owner AP1 may also receive one or more UL data communications $724_1$ from one or more STAs in its BSS beginning at time is using some or all of the available time and frequency resources. Each of the STAs may transmit an UL data communication at a TX power equal to or less than the maximum TX power for its BSS. For example, the TXOP owner AP1 may transmit a trigger frame that triggers an UL data communication including multiple data frames from multiple STAs using one or more of MU OFDMA or MU MIMO in the form of a MU PPDU, or an UL data communication from each of one or more single STAs sequentially in the form of respective SU PPDUs. In some such implementations in which the TXOP owner AP1 receives one or more UL data communications $724_1$, the TXOP owner AP1 may respond with ACK frames (such as BAs) also using some or all of the available time and frequency resources of the data transmission phase 708.

In some implementations, prior to transmitting any communications $724_1$ to any of its associated STAs, the TXOP owner AP1 may perform a CSMA operation in a beginning portion of the data transmission phase 708. For example, the TXOP owner AP1 may perform physical carrier sensing, and specifically energy detection, to determine whether the wireless medium is idle prior to transmitting any data, trigger, management or control frames during the data transmission phase 708. If the TXOP owner AP1 senses that the wireless medium is not idle, it may forgo transmitting any communications in the data transmission phase 708. In some implementations, one or more parameters for the carrier sensing may be indicated in the trigger frame 722.

Similar to the TXOP owner AP1, the second AP2 may transmit or receive one or more data communications 7242 to or from one or more STAs in its BSS beginning at time is using some of all of the available time and frequency resources indicated by the TXOP owner during the schedule allocation phase 706. Similarly, the third AP3 may transmit or receive one or more data communications 7243 to or from one or more STAs in its BSS beginning at time is using some of all of the available time and frequency resources indicated by the TXOP owner during the schedule allocation phase 706. Similarly, the fourth AP4 may transmit or receive one or more data communications 7244 to or from one or more STAs in its BSS beginning at time is using some of all of the available time and frequency resources indicated by the TXOP owner during the schedule allocation phase 706.

Also similar to the TXOP owner AP1, prior to transmitting any communications 724 to any of their associated STAs, the selected APs may perform CSMA operations in a beginning portion of the data transmission phase 708. For example, each of the selected APs may perform physical carrier sensing, and specifically energy detection, to determine whether the wireless medium is idle prior to transmitting any data, trigger, management or control frames, as described above with reference to the TXOP owner AP1.

In some implementations, the TXOP owner AP1 may partition the TXOP into multiple schedule allocation phases 706 and multiple respective data transmission phases 708 (each including time and frequency resources shared by multiple APs). In some such implementations, there may be only one TXOP indication phase 704 because the TXOP owner AP1 may only need to learn of each of the other APs' measured RX power of the CTS frame and intent to participate in the TXOP once.

Figure 10:
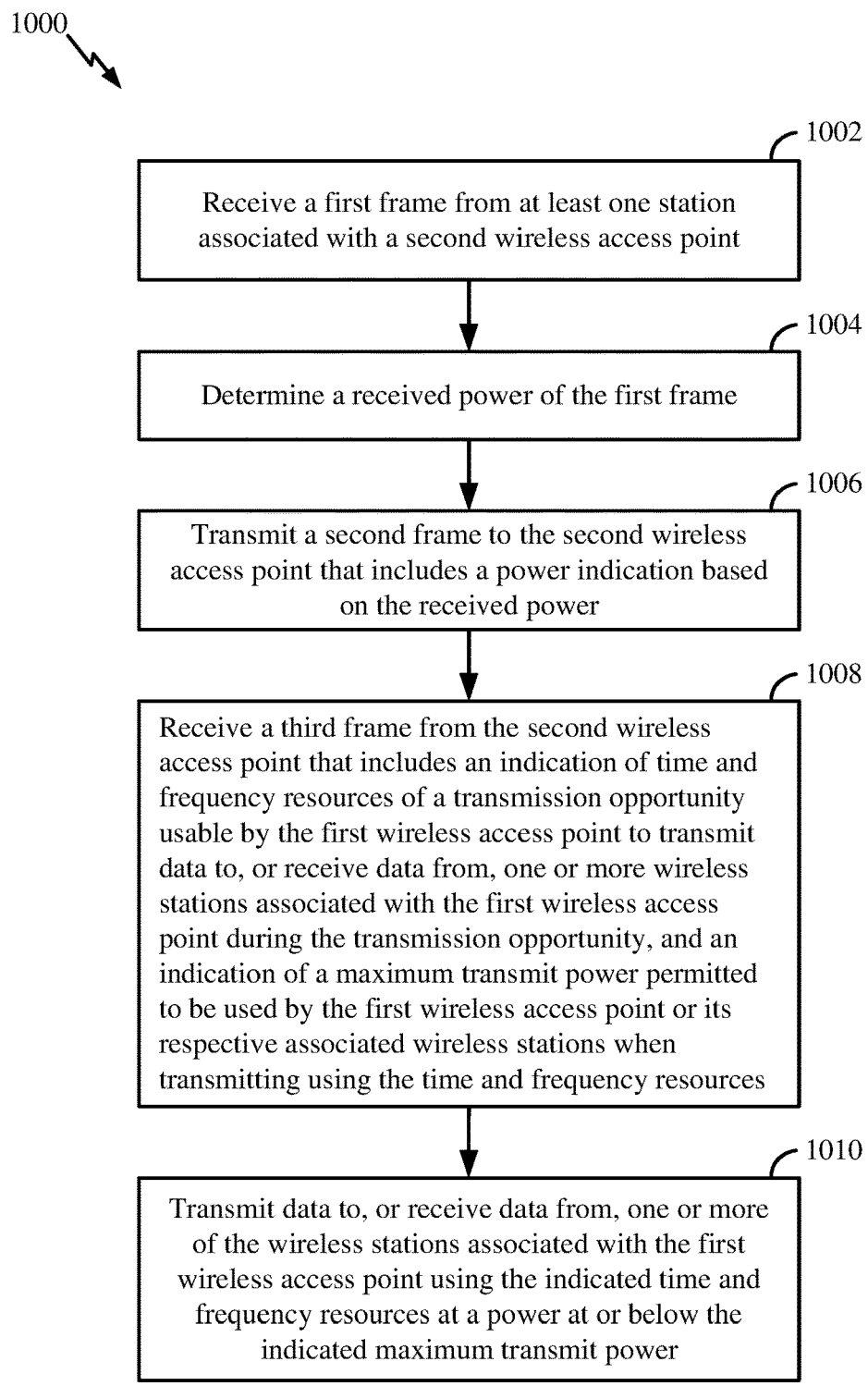
FIG. 10 shows a flowchart illustrating an example process for coordinated wireless communication that supports resource sharing according to some implementations.

FIG. 10 shows a flowchart illustrating an example process 1000 for coordinated wireless communication that supports resource sharing according to some implementations. The operations of the process 1000 may be implemented by an AP or its components as described herein. For example, the process 1000 may be performed by a wireless communication device such as the wireless communication device 400 described above with reference to FIG. 4. In some implementations, the process 1000 may be performed by an AP, such as one of the APs 102 and 502 described above with reference to FIGS. 1 and 5A, respectively.

In some implementations, in block 1002, the wireless communication device (hereinafter referred to as AP2 from the selected APs in FIG. 7) receives a first frame from at least one STA associated with a second AP (for example, the TXOP owner AP1). In block 1004, AP2 measures or otherwise determines an RX power of the first frame. In block 1006, the first AP transmits a second frame to the TXOP owner AP1 that includes a power indication based on the received power. In block 1008, AP2 may receive a third frame from the TXOP owner AP1 that includes an indication of time and frequency resources of the TXOP usable by AP2 to transmit data to, or receive data from, one or more STAs associated with AP2 during the TXOP. The third frame further includes an indication of a maximum TX power permitted to be used by AP2 or its respective associated STAs when transmitting using the time and frequency resources. In block 1010, AP2 may then transmit data to, or receive data from, one or more of the STAs associated with AP2 using the indicated time and frequency resources at a power at or below the indicated maximum TX power.

In some examples, the first frame received in block 1002 is a control frame, such as a CTS frame 712 transmitted in response to an RTS frame 710 from the TXOP owner AP1. In some such examples, the RX power determined in block 1004 may be an RSSI value for the CTS frame 712.

In some implementations, AP2 may, after receiving the first frame and prior to transmitting the second frame, receive a fourth frame from the TXOP owner AP1 that indicates that a plurality of time and frequency resources of the TXOP 702 can be shared by the TXOP owner AP1. For example, the fourth frame may be a CTI frame 714, and the second frame transmitted by AP2 in block 1006 may be a CTR frame 716. In some implementations, the CTI frame 714 includes at least one trigger frame configured to trigger AP2 to transmit the CTR frame 716. As described above, a source address field and a BSSID field (for example, in a MAC header) associated with the CTI frame 714 may be set to the MAC address of the TXOP owner and a destination address field (for example, in the MAC header) associated with the CTI frame 714 may be set to a broadcast address.

As described above, the CTI frame 714 may include an indication of one or both of frequency resources or spatial resources usable by AP2 to transmit its respective CTR frame 716. For example, each trigger frame of the CTI frame 714 may include a user information field for each of the APs participating in the TXOP 702, including AP2, that includes the respective indication of the frequency resources or the spatial resources AP2 is to use to transmit its CTR frame 716. As described above, the user information field for AP2 may include a respective APID of AP2. For example, the APID may be a MAC address of AP2, a BSSID associated with AP2 or a BSS color associated with AP2. In some other implementations in which the TXOP owner AP1 may not be aware of some or all of the neighboring APs, the CTI frame 714 may include an indication of random access resources usable by AP2 to transmit its respective CTR frame 716.

As described above, the CTR frame 716 may indicate a desire by AP2 to participate in the TXOP 702. In some implementations, as described above, the CTR frame 716 includes the power indication. For example, the power indication may be the RX power of the CTS frame 712 measured by AP2. In some other implementations, the power indication may be another metric, parameter or value based on the RX power. In some implementations, the transmission of the CTR frame 716 or the power indication may serve as the indication that AP2 desires to participate in the TXOP 702.

AP2 may transmit the CTR frame 716 in a trigger-based PPDU in response to the CTI frame 714 using the frequency or spatial resources allocated by the CTI frame 714. For example, AP2 may transmit the CTR frame 716 via MU OFDMA or MU MIMO techniques a SIFS duration after the CTI frame 714. The CTI frame 714 may be configured to cause AP2 to respond with its CTR frame 716 regardless of its respective NAV. In some other implementations, the TXOP owner AP1 may transmit multiple CTI frames 710, each to a respective one of the APs, on an access point-by-access point sequential basis. For example, the CTI frame 714 may be a poll frame and the CTR frame 716 may be a poll response frame.

As described above, after transmitting the CTR frame 716, AP2 receives a third frame, for example, a CTAS frame 718 that identifies the APs, including AP2, selected to participate in the TXOP 702. The CTAS frame 718 includes the indication of the available time and frequency resources and the indication of the maximum transmit power usable by AP2 to transmit data to, or receive data from, one or more respective associated STAs during the data transmission phase 708. In some implementations, a source address field and a BSSID field (for example, in a MAC header) associated with the CTAS frame 718 may be set to the MAC address of the TXOP owner AP1 and a destination address field (for example, in the MAC header) associated with the CTAS frame 718 may be set to a broadcast address.

The CTAS frame 718 may include a user information field for each of a plurality of APs including AP2. The user information field for AP2 may include an APID of AP2, such as a MAC address of AP2, a BSSID associated with AP2 or a BSS color associated with AP2. The user information field may include an indication of a starting time and a duration of the time resources available to AP2. For example, the user information field may include an indication of a symbol, a slot or an absolute or relative time at which the allocated time resources begin and a duration of the respective allocated time resources, for example, in units of symbols, slots or ms. The user information field may additionally include an indication of frequency resources (such as one or more channels, subchannels or RUs) available for use by AP2.

In some implementations, the user information field for AP2 further includes the indication of the maximum TX power usable by AP2 to transmit data to, or receive data from, one or more respective associated STAs during the data transmission phase 708 via the indicated time and frequency resources. For example, in some implementations, each user information field includes a value (for example, in dBs per 20 MHz or in some other unit) that explicitly indicates the maximum TX power for the respective AP, for example, as calculated based on Equation 5. Additionally or alternatively, in some implementations, the TXOP owner AP1 may provide an implicit indication of the maximum TX power in the CTAS frame 718. For example, each user information field may include an indication of the maximum TX power in the form of, for example, an indication of the TX power $TX_{AP1}$ of the TXOP owner AP1, an indication of AP1's measurement of the RX power $RX_{AP1-SPA}$ of the CTS frame 712, and an indication of the SIR. In such examples, AP2 may calculate or otherwise determine the maximum transmit power $TX_{MAX}$ it is permitted to use based on the indications of $TX_{AP1}$, $RX_{AP1-STA}$, and the SIR received in the CTAS frame 718, based on its own measured RX power $RX_{CAP-STA}$ of the CTS frame 712, and based on Equation 5.

In some implementations, the process 1000 may further include transmitting an additional frame, for example, a CTLS frame 720, to one or more of its associated STAs in its BSS that identifies the available time and frequency resources and that indicates the maximum TX power. As described above, the CTAS frame 718 may include a trigger frame that triggers AP2 to transmit the CTLS frame 720 to its associated BSS simultaneously with the TXOP owner AP1 transmitting a CTLS frame 720 to its associated BSS. The CTAS frame 718 may be configured to cause AP2 to transmit the CTLS frame 720 regardless of its NAV.

As described above, the CTLS frame 720 may be a non-HT duplicate frame that, in some implementations, may be transmitted simultaneously via all of the available frequency resources of the wireless channel. In some implementations, a source address field (for example, in a MAC header) associated with the CTLS frame 720 is set to a multicast address or other predefined address associated with CAP SRMA transmissions. In some such implementations, a BSSID field (for example, in the MAC header) associated with each of the CTLS frames 720 is set to the BSSID of the TXOP owner. In some such implementations, a destination address field (for example, in the MAC header) associated with the CTLS frame 720 is set to a broadcast address.

As described above, in some implementations, the CTLS frame 720 transmitted by AP2 includes an IE or other field that includes an indication of the available time and frequency resources (or a particular allocation of the time and frequency resources allocated to AP2 and its BSS). For example, the IE may include an indication of the starting time of the available or allocated time resources, such as, an indication of a symbol, a slot or an absolute or relative time at which the time resources begin. The IE may also include an indication of the duration of the time resources, for example, in units of symbols, slots or ms. Each IE may additionally include an indication of the frequency resources available for use by or allocated to AP2 and its BSS. For example, the IE may indicate one or more channels or subchannels (for example, one or more 20 MHz channels) or one or more RUs usable by AP2 and its BSS. The IE may further include an indication of the maximum TX power permitted to be used by AP2 and its BSS during the data transmission phase 708.

After transmitting the CTLS frame 720, AP2 may receive a CTTRIG frame 722 that synchronizes in time AP2 with the TXOP owner AP1. In some implementations, data communications may begin a SIFS duration after the CTTRIG frame 722. As described above, in some implementations, in addition to, or as an alternative to, indicating the maximum TX power for each of the selected APs in the CTAS frame 718, the TXOP owner AP1 may indicate the maximum TX powers in the CTTRIG frame 722. For example, the CTTRIG frame 722 may include a user information field, IE or other field for AP2 that includes a respective APID of AP2, such as a MAC address, a BSSID or a BSS color associated with AP2. The user information field, IE or other field may also include an indication of the available time and frequency resources (or a particular allocation of the time and frequency resources allocated to AP2) as well as an indication of the maximum TX power permitted to be used by AP2 and its BSS during the data transmission phase 708.

AP2 may be configured to transmit and receive data communications, ACK frames, and trigger frames regardless of its NAV during the data transmission phase 708. After receiving the CTTRIG frame 722, AP2 may transmit or receive one or more data communications 724 to or from one or more STAs in its BSS using the allocated time and frequency resources. For example, AP2 may transmit a DL data communication (for example, a PPDU) 724 including a data frame to multiple STAs using one or both of MU OFDMA or MU MIMO in the form of a MU PPDU, or may transmit one or more DL data communications to one STA at a time sequentially using SU techniques in the form of a SU PPDU. In some such implementations in which AP2 transmits one or more DL data communications 724, the associated STAs may respond with ACK frames also using one or more of the time and frequency resources available to AP2 and its BSS.

In addition to, or as an alternative to, transmitting DL data communications, AP2 may also receive one or more UL data communications 724 from one or more STAs in its BSS using the available time and frequency resources. For example, AP2 may transmit a trigger frame using the allocated resources that triggers an UL data communication including multiple data frames from multiple STAs using one or more of MU OFDMA or MU MIMO in the form of a MU PPDU, or an UL data communication from each of one or more single STAs sequentially in the form of respective SU PPDUs. In some such implementations in which AP2 receives one or more UL data communications 724, it may respond with ACK frames (such as BAs) also using one or more of the time and frequency resources available to AP2 and its BSS.

Figure 11:
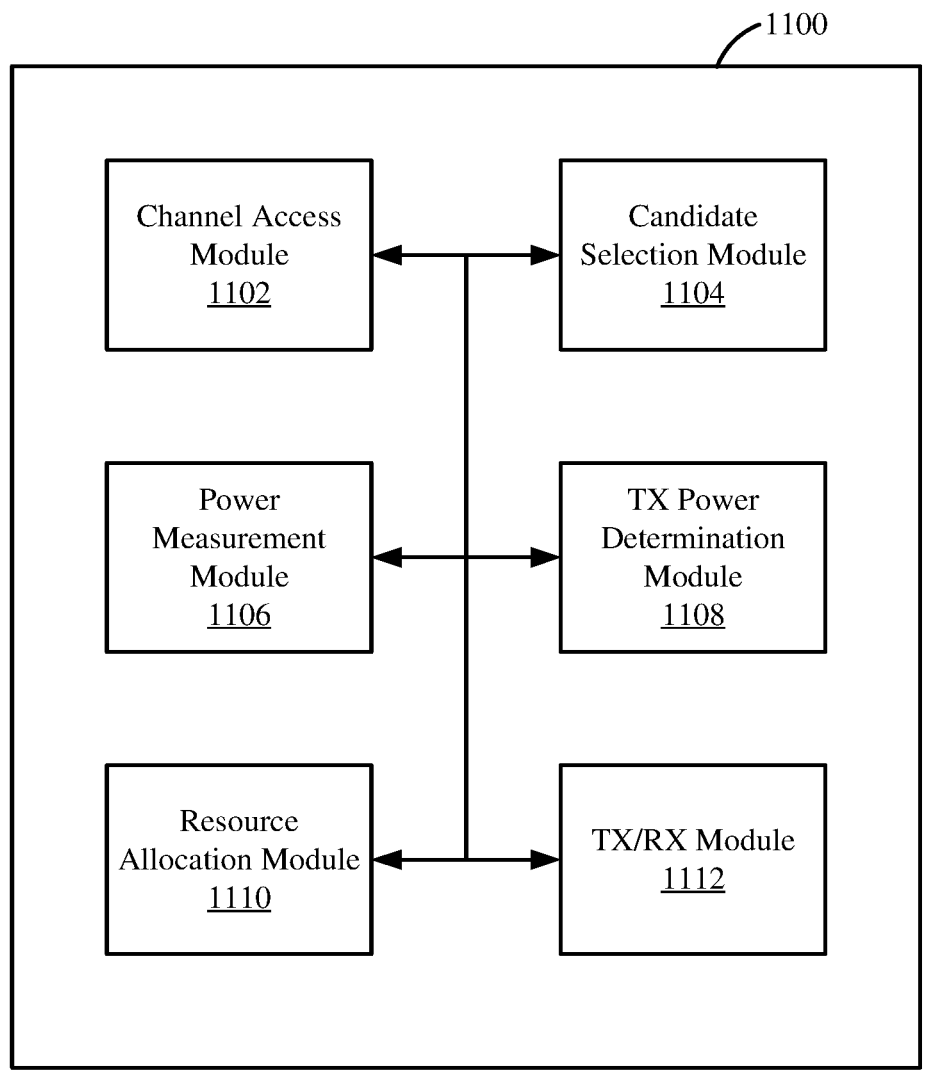
FIG. 11 shows a block diagram of an example wireless communication device that supports resource sharing according to some implementations.

FIG. 11 shows a block diagram of an example wireless communication device 1100 that supports resource sharing according to some implementations. In some implementations, the wireless communication device 1100 is configured to perform one or more of the processes 600 and 1000 described above with reference to FIGS. 6 and 10, respectively. The wireless communication device 1100 may be an example implementation of the wireless communication device 400 described above with reference to FIG. 4. For example, the wireless communication device 1100 can be a chip, SoC, chipset, package or device that includes at least one processor and at least one modem (for example, a Wi-Fi (IEEE 802.11) modem or a cellular modem). In some implementations, the wireless communication device 1100 can be a device for use in an AP, such as one of the APs 102 and 502 described above with reference to FIGS. 1 and 5A, respectively. In some other implementations, the wireless communication device 1100 can be an AP that includes such a chip, SoC, chipset, package or device as well as at least one transmitter, at least one receiver, and at least one antenna.

The wireless communication device 1100 includes a channel access module 1102, a candidate selection module 1104, a power measurement module 1106, a TX power determination module 1108, a resource allocation module 1110, and a transmission and reception (TX/RX) module 1112. Portions of one or more of the modules 1102, 1104, 1106, 1108, 1110 and 1112 may be implemented at least in part in hardware or firmware. For example, the channel access module 1102, the power measurement module 1106 and the TX/RX module 1112 may be implemented at least in part by a modem (such as the modem 402). In some implementations, at least some of the modules 1102, 1104, 1106, 1108, 1110 and 1112 are implemented at least in part as software stored in a memory (such as the memory 408). For example, portions of one or more of the modules 1102, 1104, 1106, 1108, 1110 and 1112 can be implemented as non-transitory instructions (or "code") executable by a processor (such as the processor 406) to perform the functions or operations of the respective module.

The channel access module 1102 is configured to obtain a TXOP for wireless communication via a wireless channel including multiple time and frequency resources. For example, the channel access module 1102 may be configured to perform block 602 of the process 600 described with reference to FIGS. 6-9. In some implementations, to obtain the TXOP, the channel access module 1102 contends for access to the wireless medium on one or more channels including a primary operating channel (for example, a primary 20 MHz channel and one or more secondary 20 MHz, 40 MHz, 80 MHz or 160 MHz channels) using, for example, CSMA/CA and enhanced distributed channel access (EDCA) techniques.

The candidate selection module 1104 is configured to select one or more other candidate wireless APs to participate in the TXOP. For example, the candidate selection module 1104 may be configured to perform block 604 of the process 600 described with reference to FIGS. 6-9. Before making the selection, the TX/RX module 1108 is configured to transmit an RTS frame to at least one of its associated STAs that elicits the transmission of a CTS frame from at least one of the STAs. For example, the TX/RX module 1108 may be configured to perform blocks 802 and 804 of the process 800 described with reference to FIG. 8. As described above, the APs, including the wireless communication device 1100, receiving the CTS frame may then measure the RX power of the CTS frame. For example, the power measurement module 1106 may be configured to perform block 806 of the process 800 to measure or otherwise determine an RX power or RSSI of the CTS frame.

So that the candidate selection module 1104 can make the selection, the TX/RX module 1108 is further configured to transmit a CTI frame to other wireless APs, for example, other APs in its ESS, that indicates that the time and frequency resources of the TXOP can be shared by the wireless communication device 1100. After transmitting the CTI frame, the TX/RX module 1108 may receive a CTR frame from each of one or more candidate APs that includes a power indication, for example, an RX power or RSSI measured by the respective AP, and that indicates a desire by the respective AP to participate in the TXOP. For example, the TX/RX module 1108 may be configured to perform blocks 808 and 810 of the process 800 described with reference to FIG. 8. The candidate selection module 1104 may select one or more of the candidate APs to participate in the TXOP based on the received power indications and based on the TX power the wireless communication device 1100 intends to use for transmissions during the TXOP.

Based on its own intended TX power, the acceptable SIR at its associated STAs, and the received power indications, the TX power determination module 1108 may then calculate or otherwise determine, for example, using Equation 5, the maximum TX power for each of the selected APs to use during the data transmission phase of the TXOP. In some implementations in which not all of the time or frequency resources of the data transmission phase are made available to each of the selected APs, the resource allocation module 1110 is configured to determine the time and frequency resources of the TXOP to allocate to each of the selected APs.

The TX/RX module 1112 is configured to generate and transmit a CTAS frame to the selected APs that includes, for each of the selected APs, an indication of the available time and frequency resources usable by the selected APs to transmit data to, or receive data from, one or more respective STAs associated with the respective AP during the data transmission phase of the TXOP. After transmitting the CTAS frame, the TX/RX module 1112 may transmit a CTLS frame to one or more associated STAs in its BSS identifying the time and frequency resources available for use by itself and its associated BSS. For example, the TX/RX module 1108 may be configured to perform block 608 of the process 600 and blocks 902 and 904 of the process 900 described with reference to FIGS. 6-9.

In some implementations, in a beginning portion of a data transmission phase, the TX/RX module 1112 transmits a CTTRIG frame to the selected APs to synchronize in time the selected APs with the wireless communication device 1100. The TX/RX module 1112 may then transmit or receive one or more DL or UL data communications to or from one or more STAs in its BSS using the available time and frequency resources it has allocated to itself. For example, the TX/RX module 1112 may transmit or receive data communications including data frames to or from multiple STAs using MU OFDMA, MU MIMO, or SU techniques. For example, the TX/RX module 1112 may be configured to perform block 610 of the process 600 described with reference to FIGS. 6-9.

The TX/RX module 1112 is further configured to receive a CTI frame from another AP that has obtained a TXOP (TXOP owner) that indicates that multiple time and frequency resources of the TXOP can be shared by the TXOP owner. The TX/RX module 1112 is further configured to transmit a CTR frame to the TXOP owner that includes a power indication, such as an indication of an RX power of a received CTS frame, and that generally indicates a desire to participate in the TXOP. For example, the TX/RX module 1112 may be configured to perform block 1006 of the process 1000 described with reference to FIG. 10. The TX/RX module 1112 is further configured to receive a CTAS frame from the TXOP owner that includes an indication of the time and frequency resources of the TXOP that are available to the wireless communication device 1100 and that are usable to transmit data to, or receive data from, one or more STAs associated with the wireless communication device 1100 during the data transmission phase of the TXOP. As described above, the CTAS frame may further include an indication of the maximum TX power usable by AP2 to transmit data to, or receive data from, one or more respective associated STAs during the data transmission phase 708 via the indicated time and frequency resources. For example, the TX/RX module 1112 may be configured to perform block 1008 of the process 1000 described with reference to FIG. 10.

As described above, the CTAS frame may include a user information field for the wireless communication device 1100 that includes a value that explicitly indicates the maximum TX power for the wireless communication device 1100. Additionally or alternatively, in some implementations, the user information field provides an implicit indication of the maximum TX power. For example, the user information field may include an indication of the maximum TX power in the form of, for example, an indication of the TX power of the TXOP owner, an indication of the TXOP owner's measurement of the RX power of the CTS frame, and an indication of the SIR. In such examples, the TX power determination module 1108 may calculate or otherwise determine the maximum transmit power it is permitted to use based on the indications of the TX power of the TXOP owner, the indication of the TXOP owner's measurement of the RX power of the CTS frame and the SIR, based on its own measured RX power of the CTS frame, and based on Equation 5.

The TX/RX module 1112 may then transmit data to, or receive data from, one or more of its associated STAs using the available time and frequency resources at a TX power at or below the maximum TX power. For example, the TX/RX module 1112 may be configured to perform block 1010 of the process 1000.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a first wireless access point, the method comprising:
   obtaining a transmission opportunity for wireless communication via a wireless channel;
   selecting one or more other wireless access points to participate in the transmission opportunity;
   determining a maximum transmit power permitted to be used by each of the one or more selected access points for transmissions during the transmission opportunity;
   transmitting a message to the one or more selected access points that includes, for each of the selected access points:
      an indication of time and frequency resources of the transmission opportunity usable by the selected access point to transmit data to, or receive data from, one or more wireless stations associated with the selected access point during the transmission opportunity, and
      an indication of the maximum transmit power for the selected access point; and
   transmitting data to, or receiving data from, one or more first wireless stations associated with the first wireless access point using time and frequency resources of the transmission opportunity.

2. The method of claim 1, further comprising:
   transmitting a first frame to at least one station of the first wireless stations associated with the first wireless access point; and
   receiving a second frame from each of one or more candidate access points including the one or more selected access points after transmitting the first frame, each second frame including a power indication, wherein the one or more selected access points are selected from the one or more candidate access points based on the power indications, and wherein the maximum transmit power for each of the one or more selected access points is based on the power indication received from the respective access point.

3. The method of claim 2, wherein the first frame is a request-to-send (RTS) frame and wherein the power indications are based on respective measurements of a received power of a clear-to-send (CTS) frame transmitted by the at least one station associated with the first wireless access point in response to receiving the RTS frame.

4. The method of claim 3, further comprising:
   receiving the CTS frame; and
   determining a power of the CTS frame received by the first wireless access point, wherein the determinations of the maximum transmit powers are based on the received power of the CTS frame.

5. The method of claim 1, wherein the indication of the respective maximum transmit power for each of the selected access points includes a signal-to-interference ratio threshold, and wherein the message further includes a received power of a clear-to-send (CTS) frame measured by the first wireless access point, and a transmit power selected by the first wireless access point for transmissions by the first wireless access point during the transmission opportunity.

6. The method of claim 1, further comprising transmitting a second message to the one or more first wireless stations that includes an indication of a maximum transmit power permitted to be used by the first wireless stations during the transmission opportunity, wherein the message includes at least one trigger frame configured to trigger the selected access points to transmit, simultaneously with the transmission of the second message by the first wireless access point, respective second messages to their respective basis service sets (BSSs) identifying the maximum transmit power permitted to be used by the respective wireless stations during the transmission opportunity.

7. The method of claim 6, wherein the at least one trigger frame includes a user information field for each of the selected access points that includes the indication of the maximum transmit power permitted to be used by the respective access point.

8. The method of claim 6, wherein each of the second messages transmitted by the first wireless access point and the selected access points includes:
   an indication of time and frequency resources that can be used by wireless stations associated with the respective access points during the transmission opportunity; and
   an information element (IE) for each of the first wireless access point and the selected access points that includes, for the respective access point, the maximum transmit power.

9. A wireless communication device comprising:
- at least one modem;
- at least one processor communicatively coupled with the at least one modem; and
- at least one memory communicatively coupled with the at least one processor and storing processor-readable code that, when executed by the at least one processor in conjunction with the at least one modem, is configured to:
    - obtain a transmission opportunity for wireless communication via a wireless channel;
    - select one or more other wireless access points to participate in the transmission opportunity;
    - determine a maximum transmit power permitted to be used by each of the one or more selected access points for transmissions during the transmission opportunity;
    - transmit a message to the one or more selected access points that includes, for each of the selected access points:
        - an indication of time and frequency resources of the transmission opportunity usable by the selected access point to transmit data to, or receive data from, one or more wireless stations associated with the selected access point during the transmission opportunity, and
        - an indication of the maximum transmit power for the selected access point; and
    - transmit data to, or receiving data from, one or more first wireless stations associated with the first wireless access point using time and frequency resources of the transmission opportunity.

10. The wireless communication device of claim 9, further comprising:
- transmitting a first frame to at least one station of the first wireless stations associated with the first wireless access point; and
- receiving a second frame from each of one or more candidate access points including the one or more selected access points after transmitting the first frame, each second frame including a power indication, wherein the one or more selected access points are selected from the one or more candidate access points based on the power indications, and wherein the maximum transmit power for each of the one or more selected access points is based on the power indication received from the respective access point.

11. The wireless communication device of claim 10, wherein the first frame is a request-to-send (RTS) frame and wherein the power indications are based on respective measurements of a received power of a clear-to-send (CTS) frame transmitted by the at least one station associated with the first wireless access point in response to receiving the RTS frame.

12. The wireless communication device of claim 11, further comprising:
- receiving the CTS frame; and
- determining a power of the CTS frame received by the first wireless access point, wherein the determinations of the maximum transmit powers are based on the received power of the CTS frame.

13. The wireless communication device of claim 9, wherein the indication of the respective maximum transmit power for each of the selected access points includes a signal-to-interference ratio threshold, and wherein the message further includes a received power of a clear-to-send (CTS) frame measured by the first wireless access point, and a transmit power selected by the first wireless access point for transmissions by the first wireless access point during the transmission opportunity.

14. The wireless communication device of claim 9, further comprising transmitting a second message to the one or more first wireless stations that includes an indication of a maximum transmit power permitted to be used by the first wireless stations during the transmission opportunity, wherein the message includes at least one trigger frame configured to trigger the selected access points to transmit, simultaneously with the transmission of the second message by the first wireless access point, respective second messages to their respective basis service sets (BSSs) identifying the maximum transmit power permitted to be used by the respective wireless stations during the transmission opportunity.

15. The wireless communication device of claim 14, wherein the at least one trigger frame includes a user information field for each of the selected access points that includes the indication of the maximum transmit power permitted to be used by the respective access point.

16. The wireless communication device of claim 14, wherein each of the second messages transmitted by the first wireless access point and the selected access points includes:
- an indication of time and frequency resources that can be used by wireless stations associated with the respective access points during the transmission opportunity; and
- an information element (IE) for each of the first wireless access point and the selected access points that includes, for the respective access point, the maximum transmit power.

* * * * *